United States Patent [19]

Morimoto et al.

[11] Patent Number: 5,260,384

[45] Date of Patent: Nov. 9, 1993

[54] POLYETHYLENE COMPOSITION

[75] Inventors: Toshifumi Morimoto, Yokohama; Toshiyuki Miyauchi, Chiba; Sumio Ikeda, Yokohama; Kunimichi Kubo, Tokyo; Narumi Ishikawa, Nagareyama; Noboru Ikegami, Chigasaki, all of Japan

[73] Assignee: Nippon Petrochemicals Company, Ltd., Tokyo, Japan

[21] Appl. No.: 941,314

[22] Filed: Sep. 4, 1992

[30] Foreign Application Priority Data

Sep. 6, 1991 [JP] Japan .................. 3-255828

[51] Int. Cl.⁵ .............. C08L 23/06; C08L 23/08; C08F 297/08
[52] U.S. Cl. .................. 525/240; 525/53; 525/320; 525/324
[58] Field of Search .............. 525/240, 324, 53

[56] References Cited

U.S. PATENT DOCUMENTS

| | | | |
|---|---|---|---|
| 4,336,352 | 6/1982 | Sakurai et al. | 525/240 |
| 4,438,238 | 3/1984 | Fukushima et al. | 525/240 |
| 4,525,322 | 6/1985 | Page et al. | 525/240 |
| 4,550,143 | 10/1985 | Tanaka et al. | 525/240 |
| 4,835,219 | 5/1989 | Tajima et al. | 525/240 |
| 4,933,393 | 6/1990 | Toyota et al. | 525/324 |
| 5,019,627 | 5/1991 | Honma et al. | 525/240 |
| 5,079,287 | 1/1992 | Takeshi et al. | 525/240 |
| 5,102,955 | 4/1992 | Calabra et al. | 525/240 |
| 5,126,398 | 6/1992 | Lee et al. | 525/53 |
| 5,189,106 | 2/1993 | Morimoto et al. | 525/324 |

FOREIGN PATENT DOCUMENTS 57-141409 9/1982 Japan .
02235947 9/1990 Japan .

Primary Examiner—Carman J. Seccuro, Jr.
Attorney, Agent, or Firm—Birch, Stewart, Kolasch & Birch

[57] ABSTRACT

A polyethylene composition which has a wide molecular weight distribution and excellent balance among melt elasticity, flow characteristics and mechanical properties, and which is suitable for use in producing large-scaled hollow plastics articles. The composition comprises a higher molecular weight ethylene polymer or copolymer and a lower molecular weight ethylene polymer or copolymer which is specified in view of the content of o-dichlorobenzene and the ratio of the area under the elution temperature-eluate volume curve between 25° to 90° C. to the area under said curve of 90° C. and above in temperature rising elution fractionation.

4 Claims, 5 Drawing Sheets (a) EXAMPLE 2

(b) COMPARATIVE EXAMPLE 2

POLYETHYLENE COMPOSITION

BACKGROUND OF THE INVENTION

1. Field of the Invention

This invention relates to a novel polyethylene composition. More particularly, the invention relates to a polyethylene composition which is excellent in melt elasticity such as melt tension and die swell ratio, flow characteristics such as workability, and mechanical properties such as impact resistance and tensile strength, and which has a wide molecular weight distribution. Especially, the polyethylene composition of the invention excels in mechanical properties at low temperatures having large values in melt tension and die swell ratio, so that the composition is suitable to use in making large hollow articles such as gasoline storage tanks and extruded articles such as large-diameter pipes.

2. Description of the Prior Art

In the conventional art, there are proposed methods to widen the molecular weight distribution of an ethylene-α-olefin copolymer in order to improve the flow characteristics (e.g. Japanese Laid-Open Patent Publication No. Sho 57-21409 and Japanese Patent Publication No. Sho 63-7741). Even when the molecular weight distribution is widened like in the proposed methods, the melt elasticity and mechanical properties, particularly low temperature mechanical properties, cannot be improved but they are made worse to the contrary.

Furthermore, concerning the improvement in mechanical properties and flow characteristics of ethylene-α-olefin copolymers which are composed of high molecular weight components and low molecular weight components, it was tried to improve not only the mechanical properties and flow characteristics but also the environmental stress cracking resistance (ESCR) by specifying the degree of short chain branching in high molecular weight components and by introducing a large quantity of short branched chains into the high molecular weight components (Japanese Laid-Open Patent Publication No. Sho 54-100444 and Japanese Patent Publication No. Sho 64-7096). The methods are, however, still unsatisfactory in view of the mechanical properties, particularly the low temperature mechanical properties and melt elasticity.

Still furthermore, it is proposed in Japanese Laid-Open Patent Publication No. Hei 2-305811 that the catalyst and conditions for two-stage polymerization are specified in order to improve the impact resistance, ESCR, and pinch-off adhesion. In this method, however, the ESCR and melt elasticity can be improved to some extent but the improvement in mechanical properties, particularly, the low temperature mechanical properties and melt elasticity are not sufficiently improved.

Besides the above, polyethylene compositions for use in blow molding having improved draw-down resistance, die swell ratio and ESCR are disclosed in Japanese Laid-Open Patent Publication Nos. Sho 59-89341 and Sho 60-20946. Furthermore, three-stage polymerization methods as an improvement of two-stage polymerization method are disclosed in Japanese Patent Publication No. Sho 59-10724 and Japanese Laid-Open Patent Publication Nos. Sho 62-25105, 62-25106, 62-25107, 62-25108, and 62-25109. Also in these references, although the improvement in melt elasticity and flow characteristics is attained to some extent, the improvement is not satisfactory yet particularly in the mechanical strength at low temperatures.

BRIEF SUMMARY OF THE INVENTION

In view of the state of the art mentioned above, it is the principal object of the present invention to provide a polyethylene composition which excels in the balance of several physical properties such as melt elasticity (melt tension, die swell ratio, etc.), flow characteristics (workability etc.) and mechanical properties (impact resistance, tensile strength, etc.) and which has a range of wide molecular weight distribution. Especially, because the polyethylene composition of the invention excels in low temperature mechanical properties and has large values of melt tension and die swell ratio, it is suitable to make large blow molded articles such as gasoline tanks and extrusion molded articles such as pipes of large diameters.

Pursuant to the above object, the inventors of the present invention have carried out extensive investigations, and as a result, a novel polyethylene composition which excels in melt elasticity, flow characteristics and mechanical properties, especially in low temperature mechanical properties was found out, by combining a specific high molecular weight component and a low molecular weight component of a specific ethylene-α-olefin copolymer having a very wide distribution of short branched chains among molecules or an ethylene homopolymer containing no short branched chain, thereby accomplishing the present invention.

According to the present invention, the novel polyethylene composition comprises:

(I) 1 to 50 wt. % of a high molecular weight ethylene homopolymer or ethylene α-olefin copolymer which meets the following conditions (a) and (b):

(a) intrinsic viscosity ($\eta_1$):    9 to 45 dl/g (b) density ($d_1$):    0.890 to 0.935 g/cm$^3$ (II) 99 to 50 wt. % of a low molecular weight ethylene homopolymer or ethylene α-olefin copolymer which meets the following conditions (c) to (f):

(c) intrinsic viscosity ($\eta_2$):    0.3 to 3.0 dl/g (d) density ($d_2$):    0.890 to 0.980 g/cm$^3$ (e) in the elution temperature-eluate volume curve in temperature rising elution fractionation, the ratio S (Ib/Ia) of the area Ib under the curve of elution temperature of 25° to 90° C. to the area Ia under the curve of elution temperature of 90° C. and above, is not larger than the value $S_1$ which is calculated with the following equation, $$S_1 = 20\eta_2^{-1}\exp[-50(d_2-0.900)]$$

(f) the quantity W wt. % of the component which is soluble in 25° C. o-dichlorobenzene is not larger than the value $W_1$ that is calculated with the following equation, $$W_1 = 100\eta_2^{-0.5}\exp[-50\eta_2^{0.5}(d_2-0.900)]$$

and the intrinsic viscosity ($\eta$) of the composition is 1.0 to 6.0 dl/g, the density (d) is 0.890 to 0.970 g/cm$^3$ and the N-value calculated with the following equation is 1.7 to 3.0.

$$N\text{-Value} = \frac{\log(\dot{\gamma}_{150}/\dot{\gamma}_{20})}{\log(\tau_{150}/\tau_{20})}$$

wherein "$\dot{\gamma}$" is an apparent shear rate (sec$^{-1}$ at 210° C.) and "$\tau$" is an apparent shear stress (dyne/cm$^2$ at 210° C.) and the subscripts "20" and "150" indicate test pressures of 20 kg/cm$^2$ and 150 kg/cm$^2$, respectively.

BRIEF DESCRIPTION OF THE DRAWINGS

These and other desirable objects and features of the invention will become more apparent from the following description taken in connection with the accompanying drawings, in which.

DETAILED DESCRIPTION OF THE INVENTION

Figure 1:
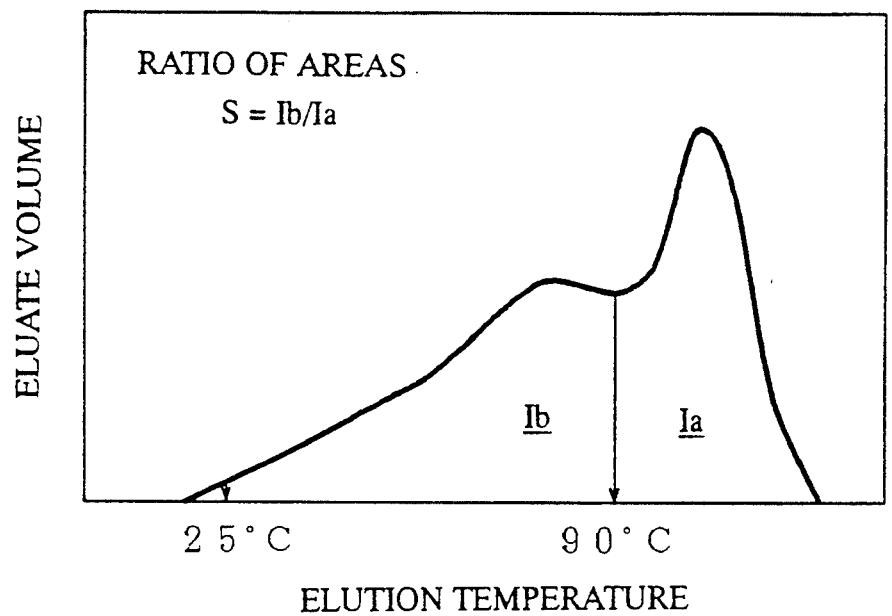
FIG. 1 is a graph showing an elution temperature-eluate volume curve in temperature rising elution fractionation (TREF) method to obtain a ratio of areas S.

In the following, the present invention will be described in more detail with reference to several examples.

The high molecular weight component (I) of the present invention is ethylene homopolymer or ethylene α-olefin copolymer. The α-olefins used for preparing the copolymer are those having 3 to 18 carbon atoms. The α-olefins having 4 to 10 carbon atoms are preferably used in view of mechanical properties of the composition. More particularly, the α-olefins are exemplified by 1-butene, 1-pentene, 1-hexene, 4-methyl-1-pentene, 1-octene, 1-nonene and 1-decene. These α-olefins can be used as a mixture of two or more kinds.

The (a) intrinsic viscosity ($\eta_1$) of the ethylene homopolymer or ethylene-α-olefin copolymer as the higher molecular weight component (I) is in the range of 9.0 to 45 dl/g, preferably 10 to 40 dl/g, and more preferably 12 to 40 dl/g. When the value $\eta_1$ is smaller than 9.0 dl/g, the melt elasticity and mechanical properties of the obtained composition are worse. On the other hand, when the value $\eta_1$ is larger than 45 dl/g, the workability of the obtained composition is worse with the occurrence of surface roughening and fish eyes.

The (b) density ($d_1$) of the component (I) is in the range of 0.890 to 0.935 g/cm$^3$, preferably 0.890 to 0.930 g/cm$^3$. When the density (d) is lower than 0.890 g/cm$^3$, it is undesirable because the forming operation is difficult and the composition is tacky. On the other hand, when the density ($d_1$) is higher than 0.935 g/cm$^3$, it is not desirable in that mechanical properties, especially low temperature mechanical properties, are not good.

The low molecular weight component (II) of the present invention is also ethylene homopolymer or ethylene-α-olefin copolymer. The α-olefins used for preparing the copolymer are those having 3 to 18 carbon atoms as those used for preparing the component (I). The α-olefins having 4 to 10 carbon atoms, such as 1-butene, 1-pentene, 1-hexene, 4-methyl-1-pentene, 1-octene, 1-nonene and 1-decene, are preferably used in view of mechanical properties of the obtained composition. These α-olefins can be used as a mixture of two or more kinds.

The (c) intrinsic viscosity ($\eta_2$) of the above low molecular weight component (II) is in the range of 0.3 to 3.0 dl/g, and preferably 0.6 to 3.0 dl/g. When the value $\eta_2$ is smaller than 0.3 dl/g, the mechanical properties, especially low temperature mechanical properties of the obtained composition are worse. On the other hand, when the value $\eta_n$ is larger than 3.0 dl/g, the flow characteristic is impaired, both of the above are not desirable.

The (d) density ($d_2$) of the component (II) is in the range of 0.890 to 0.980 g/cm$^3$, preferably 0.900 to 0.975 g/cm$^3$. When the density ($d_2$) is lower than 0.890 g/cm$^3$, it is undesirable because the forming operation is difficult and the obtained composition is tacky. On the other hand, when the density is higher than 0.980 g/cm$^3$, it is not desirable in that the forming operation is difficult as well as the mechanical properties of obtained composition are not good.

The foregoing condition (e) of the component (II) of the present invention quantitatively defines the distribution of branched chains utilizing the property that a highly branched component containing much moiety of short branched chains is dissolved in a cold solvent but low branched component is hardly dissolved unless the solvent is heated to a high temperature. The distribution of branched chain in the component (II) is measured in view of the dissolving temperature in a solvent according to Temperature Rising Elution Fractionation (TREF) of L. Wild et al., Journal of Polymer Science: Polymer Physics Edition, Vol. 20, 441–455 (1982)). It is necessary that, in the elution temperature-eluate volume curve in TREF method, the area Ib under the curve of elution temperature of 25° to 90° C. and the area Ia under the curve of elution temperature above 90° C. must have a specific relationship. In the present invention the ratio of areas (S=Ib/Ia) in the schematically illustrated FIG. 1 must not exceed the value $S_1$ which is calculated with the following equation $$S_1 = 20\eta_2^{-1} \exp[-50(d_2 - 0.900)]$$

When the value S exceeds the value $S_1$, it is not desirable because the distribution of branched chains is almost even, which results in the decrease of highly branched components that are quite effective to improve the mechanical properties, especially the low temperature mechanical properties.

In the component (II) of the present invention, the content (f) which is soluble in 25° C. o-dichlorobenzene indicates the quantity of component which contains branched chains of a very large quantity to the extent that it cannot be determined by the continuously temperature rising elution fractionation because the elution temperature is too low. This value must be a specific value corresponding to the intrinsic viscosity and the density. This value indicates also the existence of undesirable low molecular weight component, which must be possibly removed. The quantity of soluble content W wt. % must not be larger than the value $W_1$, and preferably smaller than $W_2$ which are calculated with the following equations:

$$W_1 = 100\eta_2^{-0.5} \exp[-50\eta_2^{0.5}(d_2 - 0.900)]$$

$$W_2 = 90\eta_2^{-0.5}\exp[-50\eta_2^{0.5}(d_2-0.900)]$$

The value (W) of larger than $W_1$ indicates the existence of undesirable low molecular weight component besides the component containing quite a large quantity of branched chains, which results in the lowering of mechanical properties, especially low temperature mechanical properties.

The compounding ratios of both the components in the present invention are 1 to 50 wt. % of component (I) and 99 to 50 wt. % of component (II), preferably 3 to 40 wt. % and 97 to 60 wt. %, respectively. If the quantity of component (I) is smaller than 1 wt. %, the melt elasticity and mechanical properties, especially low temperature mechanical properties, are not good. Meanwhile, when the quantity exceeds 50 wt. %, the flow characteristics becomes worse. Accordingly, the compositions on both the outside of the above range cannot be used.

As described above, the composition of the present invention can be prepared by mixing both the components (I) and (II) together, in which the properties of the composition after the mixing must be within the specific ranges. That is, the intrinsic viscosity ($\eta$) of the polyethylene composition must be in the range of 1.0 to 6.0 dl/g and preferably 1.5 to 5.0 dl/g. When the value ($\eta$) is lower than 1.0 dl/g, the melt viscosity and mechanical properties, especially low temperature mechanical properties are not good and when it exceeds 6.0 dl/g, flow characteristics not good, both of which are not desirable.

The density (d) of the polyethylene composition is in the range of 0.890 to 0.970 g/cm$^3$, preferably 0.900 to 0.970 g/cm$^3$. The density (d) lower than 0.890 g/cm$^3$ is not desirable because the plastic forming operation is difficult and the composition is tacky. On the other hand, when the density (d) is higher than 0.970 g/cm$^3$, the mechanical strength is low.

It is necessary that the N-value of polyethylene composition is in the range of 1.7 to 3.0, preferably 1.7 to 2.8. When the N-value is lower than 1.7, the high speed forming is difficult. When the N-value is higher than 3.0, melt fracture is liable to occur.

The method to prepare the polyethylene composition of the present invention is not particularly limited. For example, the component (I) and the component (II) are prepared separately through single-stage polymerization processes and they are then mixed together by a conventional method. The polyethylene composition may also be prepared by the conventionally known two-stage polymerization process or by multi-step polymerization process.

In the former preparation by mixing, any known method can be adopted by using a uniaxial extruder, biaxial extruder or Banbury mixer or by solution mixing method.

In the above-mentioned multi-step polymerization method, a plurality of reactors are used. For example, a first reactor is set to polymerization conditions for a higher molecular weight polymer corresponding to the component (I) and a second reactor is set to polymerization conditions for a lower molecular weight polymer of the component (II). The polymerization product from the first reactor is continuously passed into the second reactor to obtain the polyethylene composition. In this procedure, each component (I) or (II) may be prepared in any of the reactors. That is, preparation can be carried out in arbitrary order and number of steps.

In the above process, the type of reaction is not limited, for example, any one of slurry polymerization method, gas phase polymerization method, solution polymerization method and high pressure ionic polymerization method can be employed. The polymerization catalyst is not limited either. For example, any one of Ziegler catalyst, Phillips catalyst and Kaminsky catalyst can be used.

Especially desirable catalyst is highly active Ziegler catalyst carried on a solid carrier which will be described in more detail.

The highly active Ziegler catalyst comprises a solid component of transition metal compound which is carried on an inorganic solid carrier. The inorganic solid carriers are exemplified by metallic magnesium, magnesium hydroxide, magnesium carbonate, magnesium oxide, magnesium chloride, several kinds of alumina, silica, and silica-alumina, or double salts or double oxides, hydrates of carbonates and hydrates of silicates containing magnesium one member selected from silicon, aluminum and calcium, and the substances which are prepared by treating or reacting these inorganic solid carriers with oxygen-containing compounds, sulfur-containing compounds, hydrocarbons or halogen-containing compounds. The transition metal compounds are exemplified by halides, alkoxyhalides, oxides and halogenated oxides of transition metals such as titanium, vanadium, zirconium and chromium, or the combinations of these compounds with organometallic compounds of metals of Group I to IV of the periodic table, and preferably organo-zinc compound or organo-aluminum compounds, or the substances which are prepared by pretreating the above exemplified materials with $\alpha$-olefins. The catalytic is generally more than 50 g-polymer/g-catalyst.hr.kg/cm$^2$-olefin pressure, and preferably more than 100 g-polymer/g-catalyst.hr.kg/cm$^2$-olefin pressure.

With in the scope of the present invention, any conventionally know additive can be incorporated into the polyethylene composition. The additives are exemplified by other olefinic polymers such as high, medium and low density polyethylene, linear low density polyethylene, ultra low density polyethylene, ethylene-vinyl acetate copolymer, ethylene-ethylacrylate copolymer, ethylene-ethylmethacrylate copolymer and polypropylene; rubber, antioxidant, UV absorber, light stabilizer, lubricant, antistatic agent, antiblocking agent, processing aid and coloring pigment.

In the following, the present invention will be described in more detail with reference to several examples. The preferred embodiments described herein are illustrative and by no means restrictive, of the scope of the invention being indicated by the appended claims and all variations which come within the meaning of the claim are intended to be embraced therein.

In the first place, the test methods employed hereinafter are described.

(1) Intrinsic Viscosity

The value of ($\eta$) was measured in 135° C. decalin solution.

(2) Density

Measured by density gradation tube method at 23° C. according to JIS K 6760.

(3) Temperature rising elution fractionation method (TREF)

Measured According to the Method of L. Wild et al. as described in the foregoing paragraph.

(4) Ratio (S) of Areas in TREF

Measured according to the method of L. Wild et al. in the foregoing paragraph.

(5) Soluble Component (W) Soluble in 25° C. o-dichlorobenzene

A test sample (0.5 g) was heated for 2 hours in 20 ml of 135° C. o-dichlorobenzene (ODCB) to dissolve the sample completely, which was followed by cooling to 25° C. in 2hours. This solution was left to stand still at 25° C. for one night and was filtered through a Teflon filter. The filtrate was analyzed by an infrared spectrometer to obtain the absorption at a wave number of 2950 cm$^{-1}$ corresponding to the asymmetrical vibration of methylene. The concentration in the sample was determined with an obtained result in comparison with a previously made calibration curve.

(6) N-value

Measured with a flow tester (trademark: Shimadzu Capillary Rheometer made by Shimadzu Corp., Ltd.). Test sample was extruded through a die of 2 mm$\phi \times 40$ mm at 210° C. to obtain apparent shear rates at a low test pressure of 20 kg/cm$^2$ and a high test pressure of 150 kg/cm$^2$ and N-value was calculated with the following equation.

$$N\text{-Value} = \frac{\log (\dot{\gamma}_{150}/\dot{\gamma}_{20})}{\log (\tau_{150}/\tau_{20})}$$

wherein "$\dot{\gamma}$" is an apparent shear rate (sec$^{-1}$ at 210° C.) and "$\tau$" is an apparent shear stress (dyne/cm$^2$ at 210° C.) and the subscripts "20" and "150" indicate test pressures of 20 kg/cm$^2$ and 150 kg/cm$^2$, respectively.

(7) High Load Melt Flow Rate HLMFR)

Measured the value of HLMFR according to JIS K 6760° at 190° C. with 21.6 kg load.

(8) Yield Tensile Strength (YTS)

Measured according to JIS K 6760 at a tensile rate of 50 mm/min with test pieces of 2 mm in thickness.

(9) Tensile Impact Strength (TIS)

Measured according to ASTM D 1822 with test pieces of 1.5 mm in thickness.

(10) Izod Impact Strength (IIS)

Measured according to JIS K 7110 at $-40°$ C. Sheets of 3 mm thick were made from a test sample using a press. The size of test pieces was No. 2-A. The test pieces were conditioned at 23° C. and 50% relative humidity for 88 hours and they were further conditioned in an air bath at $-40°$ C. for about 3 hours. The measurement was done in a low temperature room at $-40°$ C. The number of test pieces were five and an average of five test results were taken.

(11) Melt Tension (MT)

Measured at 190° C. using a melt tension tester made by Toyo Seiki Seisaku-sho, Ltd.

(12) Die Swell Ratio (DSR)

Test samples were extruded at 210° C. with a flow tester (trademark: Shimadzu Capillary Rheometer made by Shimadzu Corp., Ltd.) and the ratio of the diameter of strand to the inner diameter of the die was obtained. The measurement was done at a shear rate of 100 sec$^{-1}$.

(13) Environmental Stress Cracking Resistance (ESCR)

Measured according to JIS K 6760 and the value of F$_{50}$ of constant strain ESCR was indicated.

EXAMPLES 1 TO 6 AND COMPARATIVE EXAMPLES 1 TO 6

Preparation of Higher Molecular Weight Polymers

A 50 liter reaction vessel equipped with a stirrer was used. Using a catalyst of titanium tetrachloride supported on a solid carrier containing a component of anhydrous magnesium chloride and, a promoter of triethyl aluminum (TEA), single stage polymerization was carried out in an atmosphere of N$_2$ under the conditions shown in Table 1, thereby obtaining higher molecular weight polymers of A1 to A4. The physical properties of obtained polymers are also shown in Table 1.

The polymers of A1 and A2 meet the standards required in the present invention, however, the polymers of A3 and A4 do not meet the standards in view of the intrinsic viscosity in the former one and the density in the latter one.

Preparation of Lower Molecular Weight Polymers

Using a reaction vessel, catalyst and promoter like those used in the preparation of the higher molecular weight polymers, single stage polymerization was carried out in an atmosphere of N$_2$ under the conditions shown in Table 2, thereby obtaining lower molecular weight polymers of B1 to B5. The physical properties of obtained polymers are also shown in Table 2.

The polymers of B1, B2 and B5 meet the standards required in the present invention, however, the polymers of B3 and B4 do not meet the standards in view of the value of W in the former one and the value of S in the latter one.

Preparation of Composition

Polyethylene compositions were prepared by blending these polymers under the following conditions by solution blending method. The compositions were used in Examples and Comparative Examples for evaluating physical properties, the results of which are shown in Table 3 and Table 4.

| (Blending Conditions) | |
|---|---|
| Atmosphere: | N$_2$ |
| Solvent: | Xylene (4.5 liter) |
| Qty. of Test Sample: | 200 g in total |
| Temperature: | 200° C. |
| Time Length: | 2 hours |
| Solvent for Deposition: | $-20°$ C. methanol (8 liter) |
| Solvent for Washing: | Hexane |
| Washing: | Until no xylene odor was felt |
| Drying: | From room temp. to 110° C. |
| Polymer Recovery Ratio: | Almost 100% |

TABLE 1

Single-Stage Polymerization (1)

| Items | Units | Higher Molecular Weight Components A | | | |
|---|---|---|---|---|---|
| | | A1 | A2 | A3 | A4 |
| (Conditions) | | | | | |
| Qty. of Solvent | lit | 30 | 30 | 30 | 30 |
| Kind of Solvent | — | Hexane | Hexane | Hexane | Hexane |
| Qty. of Ethylene | — | (To maintain polymerization pressure) | | | |
| Qty. of Comonomer | g | 600 | 800 | 1200 | 0 |
| Kind of Comonomer | — | Butene-1 | Hexene-1 | Butene-1 | — |
| Qty. of Hydrogen (Initial pressure) | kg/cm$^2$ G | 0 | 0 | 0 | 0 |
| Qty. of Solid Catalyst | g | 0.3 | 0.3 | 0.2 | 0.2 |
| Qty. of Promoter (TEA) | mmol | 18 | 18 | 18 | 18 |
| Polymerization Temp. | °C. | 50 | 40 | 75 | 85 |
| Polymerization Pres. | kg/cm$^2$ G | 8 | 8 | 8 | 8 |
| Polymerization Time | hr | 1 | 1 | 1 | 1 |
| Qty. of Product | kg | 4.0 | 3.8 | 4.1 | 3.6 |
| (Physical Property) | | | | | |
| Intrinsic Viscosity $\eta_1$ | dl/g | 19 | 23 | 8 | 9 |
| Density $d_1$ | g/cm$^3$ | 0.924 | 0.920 | 0.920 | 0.938 |

TABLE 2

Single-Stage Polymerization (2)

| Items | Units | Lower Molecular Weight Components B | | | | |
|---|---|---|---|---|---|---|
| | | B1 | B2 | B3 | B4 | B5 |
| (Conditions) | | | | | | |
| Qty. of Solvent | lit | 30 | 30 | 30 | 30 | 30 |
| Kind of Solvent | — | Hexane | Hexane | Hexane | Cyclohexane | Hexane |
| Qty. of Ethylene | — | (To maintain polymerization pressure) | | | | |
| Qty. of Comonomer | g | 200 | 1600 | 1900 | 1200 | 1600 |
| Kind of Comonomer | — | Butene-1 | Butene-1 | Butene-1 | Butene-1 | Hexene-1 |
| Qty. of Hydrogen (Initial pressure) | kg/cm$^2$ G | 3.1 | 2.0 | 2.1 | 1.4 | 2.0 |
| Qty. of Solid Catalyst | g | 0.2 | 0.2 | 0.2 | 0.2 | 0.2 |
| Qty. of Promoter (TEA) | mmol | 18 | 18 | 18 | 15 | 18 |
| Polymerization Temp. | °C. | 80 | 60 | 60 | 170 | 70 |
| Polymerization Pres. | kg/cm$^2$ G | 8 | 7 | 7 | 20 | 7 |
| Polymerization Time | hr | 1 | 1 | 1 | 1 | 1 |
| Qty. of Product | kg | 4.0 | 3.6 | 3.8 | 3.6 | 3.7 |
| (Physical Property) | | | | | | |
| Intrinsic Viscosity $\eta_2$ | dl/g | 1.4 | 1.4 | 1.4 | 1.4 | 1.4 |
| Density $d_2$ | g/cm$^3$ | 0.957 | 0.919 | 0.919 | 0.919 | 0.923 |
| Ratio of Areas S | — | 0.69 | 4.4 | 4.1 | 6.7 | 2.6 |
| Calculated $S_1$ | — | 0.83 | 5.5 | 5.5 | 5.5 | 4.5 |
| Qty. Soluble in 25° C. ODCB W | wt % | 1.03 | 14.7 | 30.3 | 3.0 | 11.1 |
| Calculated $W_1$ | wt % | 2.90 | 27.5 | 27.5 | 27.5 | 21.7 |

TABLE 3-1

Physical Properties of Composition of Single-Stage Polymerization Products (1)

| Items | Units | Example | | | | | |
|---|---|---|---|---|---|---|---|
| | | 1 | 2 | 3 | 4 | 5 | 6 |
| (Higher Molecular Weight Component A) | | | | | | | |
| Kind of A | — | A1 | A1 | A1 | A2 | A2 | A2 |
| Intrinsic Viscosity $\eta_1$ | dl/g | 19 | 19 | 19 | 23 | 23 | 23 |
| Density $d_1$ | g/cm$^3$ | 0.924 | 0.924 | 0.924 | 0.920 | 0.920 | 0.920 |
| Qty. Ratio $X_1$ | wt % | 15 | 16 | 12 | 15 | 10 | 10 |
| (Lower Molecular Weight Component B) | | | | | | | |
| Kind of B | — | B1 | B2 | B5 | B1 | B2 | B5 |
| Intrinsic Viscosity $\eta_2$ | dl/g | 1.4 | 1.4 | 1.4 | 1.4 | 1.4 | 1.4 |
| Density $d_2$ | g/cm$^3$ | 0.957 | 0.919 | 0.923 | 0.957 | 0.919 | 0.923 |
| Qty. Ratio $X_2$ | wt % | 85 | 84 | 88 | 85 | 90 | 90 |
| Ratio of Areas S | — | 0.69 | 4.4 | 2.6 | 0.69 | 4.4 | 2.6 |
| Calculated $S_1$ | — | 0.83 | 5.5 | 4.5 | 0.83 | 5.5 | 4.5 |
| Qty. Soluble in 25° C. ODCB W | wt % | 1.03 | 14.7 | 11.1 | 1.03 | 14.7 | 11.1 |
| Calculated $W_1$ | wt % | 2.90 | 27.5 | 21.7 | 2.90 | 27.5 | 21.7 |

TABLE 3-2
Physical Properties of Composition of Single-Stage Polymerization Products (1)

| Items | Units | Example 1 | 2 | 3 | 4 | 5 | 6 |
|---|---|---|---|---|---|---|---|
| (Polyethylene Composition) | | | | | | | |
| Intrinsic Viscosity $\eta$ | dl/g | 4.08 | 4.23 | 3.44 | 4.71 | 3.57 | 3.60 |
| HLMFR | g/10 min | 6.3 | 5.9 | 9.1 | 2.9 | 6.8 | 6.6 |
| Density d | g/cm$^3$ | 0.952 | 0.920 | 0.923 | 0.951 | 0.919 | 0.923 |
| N-Value | — | 2.33 | 2.30 | 2.28 | 2.58 | 2.54 | 2.55 |
| Yield Tensile Strength YTS | kgf/cm$^2$ | 280 | 130 | 140 | 280 | 120 | 140 |
| Tensile Impact Strength TIS | kgf·cm/cm$^2$ | 700 | NB(*) | NB | 900 | NB | NB |
| Izod Impact Strength IIS (−40° C.) | kgf·cm/cm$^2$ | 60 | NB | NB | 95 | NB | NB |
| Melt Tension MT | g | 60 | 58 | 48 | 70 | 55 | 56 |
| Die Swell Ratio DSR | — | 2.0 | 2.0 | 2.1 | 1.9 | 2.0 | 2.0 |
| ESCR (Constant Strain) F$_{50}$ | hr | 200 | >1000 | >1000 | 500 | >1000 | >1000 |

Note: NB(*) Not broken

TABLE 4-1
Physical Properties of Composition of Single-Stage Polymerization Products (2)

| Items | Units | Comparative Example 1 | 2 | 3 | 4 | 5 | 6 |
|---|---|---|---|---|---|---|---|
| (Higher Molecular Weight Component A) | | | | | | | |
| Kind of A | — | A1 | A1 | A3 | A3 | A4 | A4 |
| Intrinsic Viscosity $\eta_1$ | dl/g | 19 | 19 | 8 | 8 | 9 | 9 |
| Density $d_1$ | g/cm$^3$ | 0.924 | 0.924 | 0.920 | 0.920 | 0.938 | 0.938 |
| Qty. Ratio $X_1$ | wt % | 16 | 16 | 43 | 43 | 37 | 37 |
| (Lower Molecular Weight Component B) | | | | | | | |
| Kind of B | — | B3 | B4 | B1 | B2 | B1 | B2 |
| Intrinsic Viscosity $\eta_2$ | dl/g | 1.4 | 1.4 | 1.4 | 1.4 | 1.4 | 1.4 |
| Density $d_2$ | g/cm$^3$ | 0.919 | 0.919 | 0.957 | 0.919 | 0.957 | 0.919 |
| Qty. Ratio $X_2$ | wt % | 84 | 84 | 57 | 57 | 63 | 63 |
| Ratio of Areas S | — | 4.1 | 6.7 | 0.69 | 4.4 | 0.69 | 4.4 |
| Calculated $S_1$ | — | 5.5 | 5.5 | 0.83 | 5.5 | 0.83 | 5.5 |
| Qty. Soluble in 25° C. ODCB W | wt % | 30.3 | 3.0 | 1.03 | 14.7 | 1.03 | 14.7 |
| Calculated $W_1$ | wt % | 27.5 | 27.5 | 2.90 | 27.5 | 2.90 | 27.5 |

TABLE 4-2
Physical Properties of Composition of Single-Stage Polymerization Products (2)

| Items | Units | Comparative Example 1 | 2 | 3 | 4 | 5 | 6 |
|---|---|---|---|---|---|---|---|
| (Polyethylene Composition) | | | | | | | |
| Intrinsic Viscosity $\eta$ | dl/g | 4.22 | 4.23 | 4.22 | 4.23 | 4.20 | 4.21 |
| HLMFR | g/10 min | 6.5 | 5.8 | 5.5 | 5.4 | 5.2 | 5.2 |
| Density d | g/cm$^3$ | 0.920 | 0.920 | 0.941 | 0.919 | 0.950 | 0.926 |
| N-Value | — | 2.28 | 2.30 | 2.03 | 2.02 | 2.07 | 2.06 |
| Yield Tensile Strength YTS | kgf/cm$^2$ | 120 | 120 | 210 | 110 | 250 | 140 |
| Tensile Impact Strength TIS | kgf·cm/cm$^2$ | NB | NB | 680 | NB | 640 | NB |
| Izod Impact Strength IIS (−40° C.) | kgf·cm/cm$^2$ | 36 | 38 | 30 | 50 | 32 | 34 |
| Melt Tension MT | g | 42 | 44 | 26 | 24 | 28 | 26 |
| Die Swell Ratio DSR | — | 1.9 | 1.9 | 1.4 | 1.4 | 1.4 | 1.4 |
| ESCR (Constant Strain) F$_{50}$ | hr | >1000 | >1000 | 300 | >1000 | 150 | >1000 |

COMPARATIVE EXAMPLES 7 TO 11

The following commercially available resins which were used for producing large-sized hollow articles, were evaluated and the results obtained are shown in the following Table 5.

(1) Showlex 4551H made by Showa Denko K. K.
(2) Hi-zex 8200B made by Mitsui Petrochemical Industries, Ltd.
(3) Yukalon HD BZ80 made by Mitsubishi Petrochemical Co., Ltd.
(4) Tonen Polyethylene B5551 made by Tonen Chemical Corp.
(5) Novatec HD BR300 made by Mitsubishi Chemical Industries, Ltd.

TABLE 5

Physical Properties of Commercially Available Products

| Items | Units | Comparative Example 7 | 8 | 9 | 10 | 11 |
|---|---|---|---|---|---|---|
| Trademark | | Showlex 4551H | Hi-zex 8200B | Yukalon HD BZ80 | Tonen Polyethylene B5551 | Novatec HD BR300 |
| Intrinsic Viscosity $\eta$ | dl/g | 2.64 | 3.05 | 3.47 | 2.60 | 2.52 |
| HLMFR | g/10 min | 4.5 | 4.4 | 6.4 | 4.6 | 8.2 |
| Density d | g/cm$^3$ | 0.946 | 0.950 | 0.950 | 0.946 | 0.944 |
| N-Value | — | 2.34 | 2.42 | 2.70 | 2.32 | 2.50 |
| Yield Tensile Strength YTS | kgf/cm$^2$ | 240 | 250 | 240 | 240 | 220 |
| Tensile Impact Strength TIS | kgf·cm/cm$^2$ | 530 | 800 | 660 | 520 | 460 |
| Izod Impact Strength IIS ($-40°$ C.) | kgf·cm/cm$^2$ | 36 | 39 | 36 | 35 | 32 |
| Melt Tension MT | g | 36 | 20 | 25 | 39 | 27 |
| Die Swell Ratio DSR | — | 1.7 | 1.4 | 1.6 | 1.7 | 1.5 |
| ESCR (Constant Strain) F$_{50}$ | hr | 80 | 200 | 80 | 80 | 100 |

EXAMPLES 7 AND 8

In each example, a 70 liter reaction vessel equipped with a stirrer was used. Using a catalyst of titanium tetrachloride supported on a solid carrier containing a component of anhydrous magnesium chloride, and a promoter of triethyl aluminum (TEA), single stage polymerization was carried out in an atmosphere of N$_2$ under the conditions for first stage polymerization shown in Table 6, thereby carrying out continuous polymerization to prepare a lower molecular weight polymer. The polymer was continuously led into residual gas separator to separate unreacted gases. Using then a 30 liter reaction vessel with a stirrer, continuous polymerization was carried out under the conditions for second stage polymerization shown in Table 6 to prepare a higher molecular weight polymer. The quantities of produced polymers in the respective stages were calculated by thermal balance. The total quantity of them was coincident with the quantity of finally recovered polymers.

The physical properties of polymers recovered from the first stage reaction vessel and the second stage reaction vessel, were measured, the results of which are shown in the following Table 7. Incidentally, the physical properties of the higher molecular weight polymers produced in the second stage reactors were obtained by calculation.

TABLE 6

Conditions for Double-Stage Polymerization (1)

| Items | Units | Example 7 | 8 |
|---|---|---|---|
| First Stage Polymerization (Lower Molecular Weight) | | | |
| Qty. of Solvent | lit/hr | 70 | 70 |
| Qty. of Ethylene | kg/hr | 3.0 | 3.2 |
| Qty. of Comonomer | l/hr | 0.36 | 0 |
| Kind of Comonomer | — | Butene-1 | — |
| Qty. of Hydrogen | Nl/hr | 90 | 70 |
| Qty. of Solid Catalyst | g/hr | 0.6 | 0.6 |
| Qty. of Promoter (TEA) | mmol/hr | 21 | 21 |
| Polymerization Temp. | °C. | 80 | 80 |
| Polymerization Pres. | kg/cm$^2$ G | 10 | 10 |
| Polymerization Time | min | 40 | 40 |
| Second Stage Polymerization | | | |
| (Higher Molecular Weight) | | | |
| Qty. of Ethylene | kg/hr | 1.3 | 0.9 |
| Qty. of Comonomer | l/hr | 0.03 | 0.02 |
| Kind of Comonomer | — | Butene-1 | Butene-1 |
| Qty. of Hydrogen | Nl/hr | 0 | 0 |
| Polymerization Temp. | °C. | 50 | 50 |
| Polymerization Pres. | kg/cm$^2$ G | 10 | 10 |
| Polymerization Time | min | 25 | 25 |

TABLE 7-1

Physical Properties of Double-Stage Polymerization Products (1)

| Items | Units | Example 7 | 8 |
|---|---|---|---|
| (Lower Molecular Weight Component B) | | | |
| Intrinsic Viscosity $\eta_2$ | dl/g | 1.4 | 2.0 |
| Density d$_2$ | g/cm$^3$ | 0.956 | 0.957 |
| Qty. Ratio X$_2$ | wt % | 85 | 91 |
| Ratio of Areas S | — | 0.39 | 0.06 |
| Calculated S$_1$ | — | 0.87 | 0.58 |
| Qty. Soluble in 25° C. ODCB W | wt % | 1.11 | 0.46 |
| Calculated W$_1$ | wt % | 3.08 | 1.26 |
| (Higher Molecular Weight Component A) | | | |
| Intrinsic Viscosity $\eta_1$ | dl/g | 20 | 20 |
| Density d$_1$ | g/cm$^3$ | 0.923 | 0.923 |
| Qty. Ratio X$_1$ | wt % | 15 | 9 |

TABLE 7-2

Physical Properties of Double-Stage Polymerization Products (1)

| Items | Units | Example 7 | 8 |
|---|---|---|---|
| (Polyethylene Composition) | | | |
| Intrinsic Viscosity $\eta$ | dl/g | 4.19 | 3.62 |
| HLMFR | g/10 min | 5.8 | 6.2 |
| Density d | g/cm$^3$ | 0.951 | 0.954 |

TABLE 7-2-continued

Physical Properties of Double-Stage Polymerization Products (1)

| Items | Units | Example 7 | Example 8 |
|---|---|---|---|
| N-Value | — | 2.38 | 2.20 |
| Yield Tensile Strength YTS | kgf/cm$^2$ | 280 | 290 |
| Tensile Impact Strength TIS | kgf·cm/cm$^2$ | 720 | 680 |
| Izod Impact Strength IIS (−40° C.) | kgf·cm/cm$^2$ | 70 | 70 |
| Melt Tension MT | g | 65 | 60 |
| Die Swell Ratio DSR | — | 2.0 | 2.0 |
| ESCR (Constant Strain) F$_{50}$ | hr | 250 | 150 |

EXAMPLES 9 TO 12

In each example, continuous polymerization for preparing a higher molecular weight polymer was carried out using a 30 liter reaction vessel equipped with a stirrer and the same catalyst as that used in Examples 7 and 8 in an atmosphere of N$_2$ under the conditions for first stage polymerization shown in Table 8. The polymer was continuously led into a residual gas separator to separate unreacted gases. Using then a 70 liter reaction vessel with a stirrer, continuous polymerization was carried out under the conditions for second stage polymerization shown in Table 8 to prepare a lower molecular weight polymer. The quantities of produced polymers in the respective stages were calculated by thermal balance. The total quantity of them was coincident with the quantity of finally recovered polymers.

The physical properties of polymers recovered from the first stage reaction vessel and the second stage reaction vessel, were measured, the results of which are shown in the following Table 9. Incidentally, the physical properties of the higher molecular is set to polymerization in the second stage reactors were obtained by calculation.

TABLE 8

Conditions for Double-stage Polymerization (2)

| Items | Units | Example 9 | Example 10 | Example 11 | Example 12 |
|---|---|---|---|---|---|
| First Stage Polymerization (Higher Molecular Weight) | | | | | |
| Qty. of Solvent | lit/hr | 70 | 70 | 70 | 70 |
| Qty. of Ethylene | kg/hr | 1.3 | 1.3 | 0.9 | 0.9 |
| Qty. of Comonomer | l/hr | 0.03 | 0.03 | 0.02 | 0.02 |
| Kind of Comonomer | — | Butene-1 | Butene-1 | Butene-1 | Butene-1 |
| Qty. of Hydrogen | Nl/hr | 0 | 0 | 0 | 0 |
| Qty. of Solid Catalyst | g/hr | 0.6 | 0.9 | 0.6 | 0.9 |
| Qty. of Promoter (TEA) | mmol/hr | 21 | 21 | 21 | 21 |
| Polymerization Temp. | °C. | 50 | 50 | 50 | 50 |
| Polymerization Pres. | kg/cm$^2$ G | 10 | 10 | 10 | 10 |
| Polymerization Time | min | 25 | 25 | 25 | 25 |
| Second Stage Polymerization (Lower Molecular Weight) | | | | | |
| Qty. of Ethylene | kg/hr | 3.0 | 2.8 | 3.2 | 2.8 |
| Qty. of Comonomer | l/hr | 0.36 | 3.5 | 0 | 3.4 |
| Kind of Comonomer | — | Butene-1 | Butene-1 | — | Butene-1 |
| Qty. of Hydrogen | Nl/hr | 90 | 50 | 70 | 40 |
| Polymerization Temp. | °C. | 80 | 65 | 80 | 65 |
| Polymerization Pres. | kg/cm$^2$ G | 10 | 10 | 10 | 10 |
| Polymerization Time | min | 40 | 40 | 40 | 40 |

TABLE 9-1

Physical Properties of Double-Stage Polymerization Products (2)

| Items | Units | Example 9 | Example 10 | Example 11 | Example 12 |
|---|---|---|---|---|---|
| (Higher Molecular Weight Component A) | | | | | |
| Intrinsic Viscosity η$_1$ | dl/g | 20 | 20 | 20 | 20 |
| Density d$_1$ | g/cm$^3$ | 0.923 | 0.923 | 0.923 | 0.923 |
| Qty. Ratio X$_1$ | wt % | 15 | 15 | 9 | 9 |
| (Lower Molecular Weight Component B) | | | | | |
| Intrinsic Viscosity η$_2$ | dl/g | 1.4 | 1.4 | 2.0 | 2.0 |
| Density d$_2$ | g/cm$^3$ | 0.956 | 0.921 | 0.957 | 0.920 |
| Qty. Ratio X$_2$ | wt % | 85 | 85 | 91 | 91 |
| Ratio of Areas S | — | 0.40 | 2.88 | 0.07 | 1.46 |
| Calculated S$_1$ | — | 0.87 | 5.00 | 0.58 | 3.68 |
| Qty. Soluble in 25° C. ODCB W | wt % | 1.13 | 12.7 | 0.48 | 9.86 |
| Calculated W$_1$ | wt % | 3.08 | 24.4 | 1.26 | 17.2 |

TABLE 9-2

Physical Properties of Double-Stage Polymerization Products (2)

| Items | Units | Example 9 | Example 10 | Example 11 | Example 12 |
|---|---|---|---|---|---|
| (Polyethylene Composition) | | | | | |
| Intrinsic Viscosity η | dl/g | 4.20 | 4.21 | 3.64 | 3.65 |
| HLMFR | g/10 min | 5.9 | 5.7 | 6.0 | 5.8 |
| Density d | g/cm$^3$ | 0.951 | 0.921 | 0.954 | 0.920 |
| N-Value | — | 2.39 | 2.37 | 2.22 | 2.20 |
| Yield Tensile Strength YTS | kgf/cm$^2$ | 280 | 140 | 290 | 130 |
| Tensile Impact Strength TIS | kgf·cm/cm$^2$ | 740 | NB | 700 | NB |
| Izod Impact Strength IIS (−40° C.) | kgf·cm/cm$^2$ | 70 | NB | 75 | NB |
| Melt Tension MT | g | 66 | 65 | 61 | 60 |
| Die Swell Ratio DSR | — | 2.0 | 2.0 | 2.0 | 2.0 |
| ESCR (Constant | hr | 250 | >1000 | 150 | >1000 |

TABLE 9-2-continued

Physical Properties of
Double-Stage Polymerization Products (2)

| Items | Units | Example 9 | 10 | 11 | 12 |
|---|---|---|---|---|---|
| Strain) $F_{50}$ | | | | | |

Figure 2:
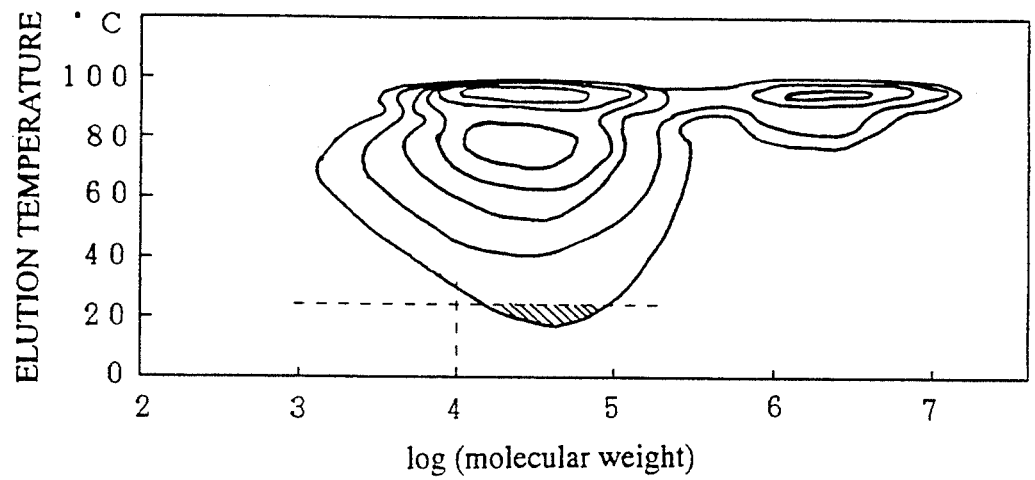
FIG. 2 is a contour graph showing the relation among elution temperatures, molecular weights and eluate quantities of the composition.
Figure 2:
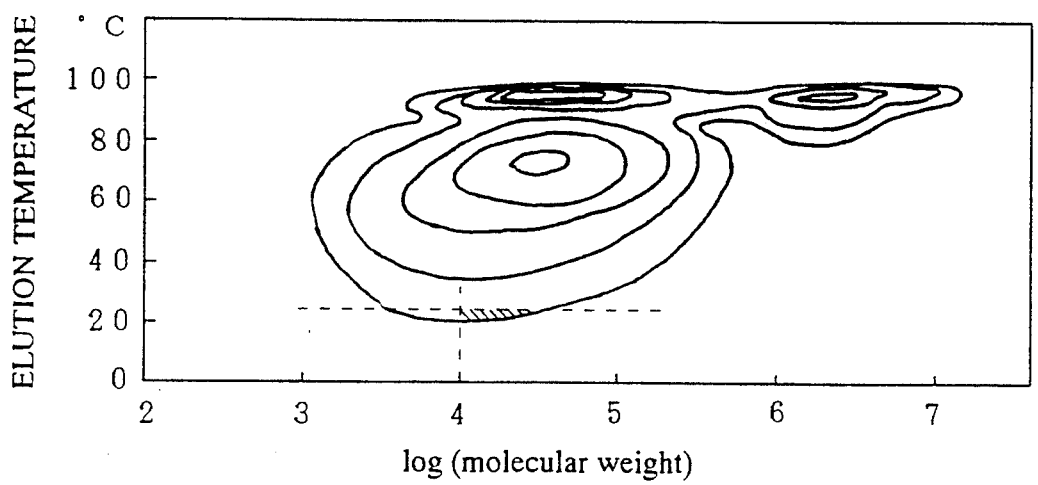

A parameter of molecular weight was added to the elution temperature-eluate volume curve by TREF shown in FIG. 1. These data were plotted schematically in FIG. 2, wherein the eluate volumes on a same level were connected as contour lines with regard to Example 2 and Comparative Example 2. For example, when the ranges of 10,000 in molecular weight or higher are compared, it will be understood that the composition in Example 2 contains much components which have low elution temperatures, i.e., the components containing larger quantities of short branched chains (soluble in 25° C. o-dichlorobenzene), as compared with those in Comparative Example 2. It is considered that these components are the main factor to improve the low temperature mechanical properties and ESCR in the present invention.

Figure 3:
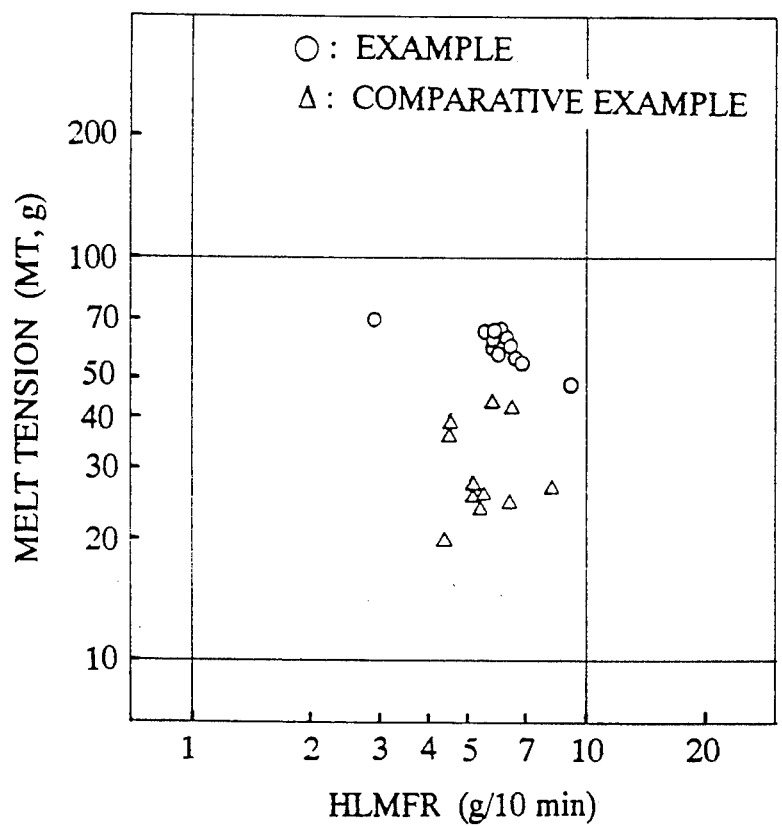
FIG. 3 is a graph showing the relation between high load melt flow rates (HLMFR's) and melt tensions.
Figure 4:
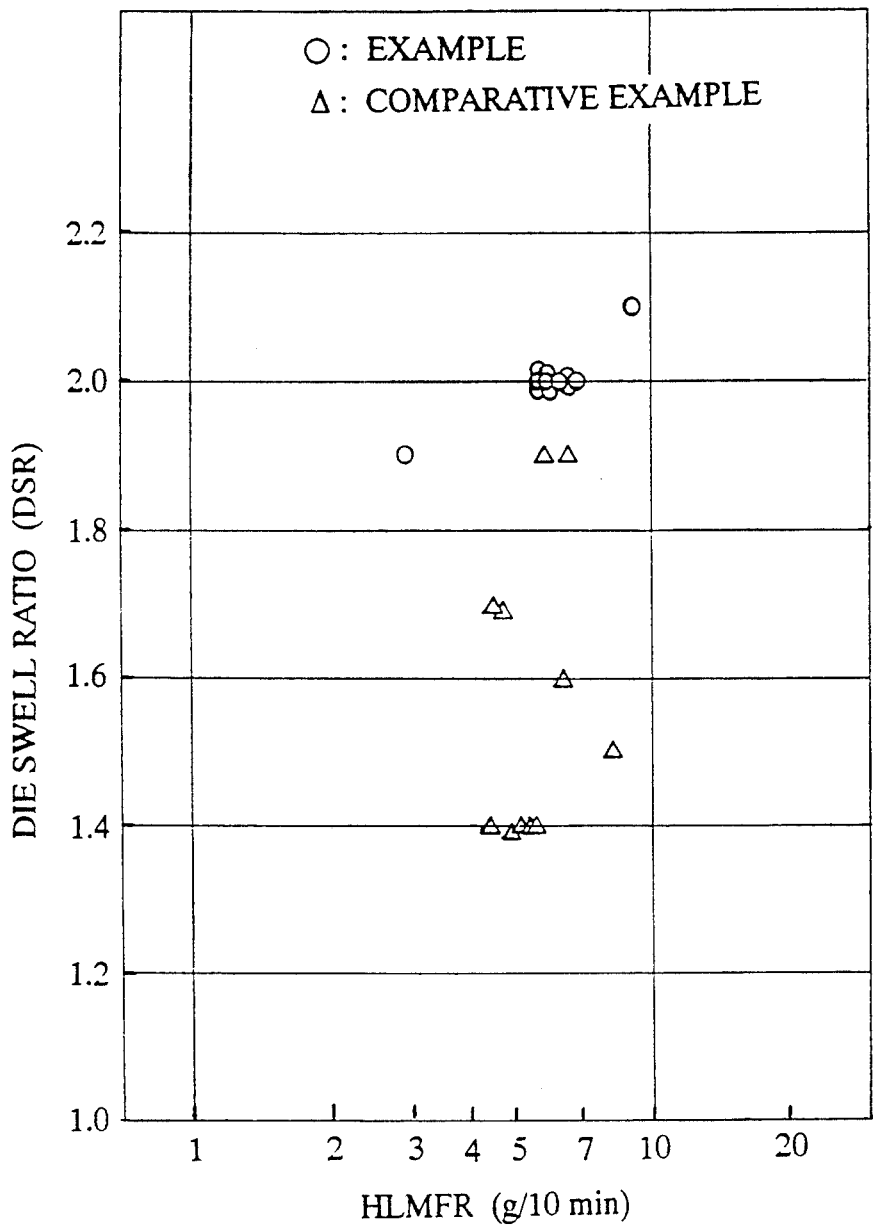
FIG. 4 is a graph showing the relation between HLMFR's and die swell ratios.
Figure 5:
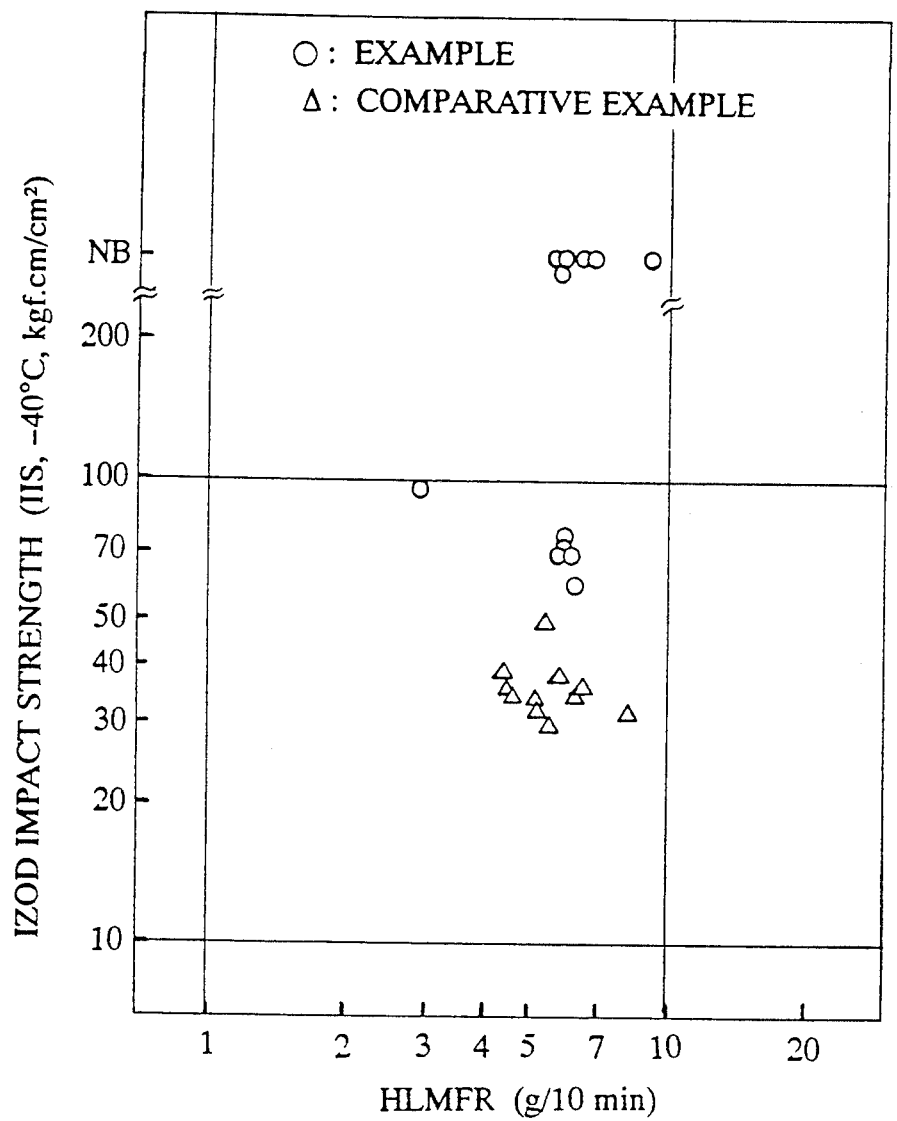
FIG. 5 is a graph showing the relation between HLMFR's and Izod impact strengths (−40° C.).

Among the data shown in the foregoing Tables, particularly important values are plotted in FIGS. 3 to 5.

From these results, it is apparent that the polyethylene composition prepared according to the present invention is quite excellent in MT, DSR and IIS ($-40°$ C.) as compared with the commercially available products having similar values in HLMFR. Accordingly, it will be understood that the polyethylene composition of the present invention excels in melt elasticity, flow characteristics and mechanical properties, particularly, in the low temperature mechanical properties.

The polyethylene composition of the present invention is excellent in the balance among melt elasticity, flow characteristics and mechanical properties and has a quite wide distribution of molecular weight. Accordingly, the composition of the present invention has the following advantages. (1) The composition excels in low temperature mechanical properties such as low temperature Izod impact strength and other low temperature resistance.

(2) The workability such as high speed forming property is good because the composition excels in melt elasticity such as melt tension and die swell ratio and flow characteristics.

With the above advantages, the polyethylene composition of the present invention can be used for producing various kinds of films, sheets, pipes, hollow containers, coating or wrapping materials and foamed materials. Furthermore, it can be used for producing largescaled hollow articles such as fuel tanks because it has excellent melt elasticity.

What is claimed is:

1. A polyethylene composition which comprises:
(I) 1 to 50 wt. % of a high molecular weight ethylene homopolymer or ethylene-α-olefin copolymer which meets the following conditions (a) and (b):

(a) intrinsic viscosity ($\eta_1$): 9 to 45 dl/g (b) density ($d_1$): 0.890 to 0.935 g/cm$^3$, and
(II) 99 to 50 wt. % of a low molecular weight ethylene homopolymer or ethylene-α-olefin copolymer which meets the following conditions (c) to (f):

(c) intrinsic viscosity ($\eta_2$): 0.3 to 3.0 dl/g (d) density ($d_2$): 0.890 to 0.980 g/cm$^3$ (e) in the elution temperature-eluate volume curve in temperature rising elution fractionation, the ratio S (Ib/Ia) of the area Ib under the curve of elution temperature of 25° to 90° C. to the area Ia under the curve of elution temperature of 90° C. and above, is not larger than the value $S_1$ which is calculated with the following equation, $$S_1 = 20\eta_2^{-1}\exp[-50(d_2-0.900)]$$

(f) the quantity W wt. % of the component which is soluble in 25° C. o-dichlorobenzene is not larger than the value $W_1$ that is calculated with the following equation, $$W_1 = 100\eta_2^{-0.5}\exp[-50\eta_2^{0.5}(d_2-0.900)]$$

and the intrinsic viscosity ($\eta$) of the composition is 1.0 to 6.0 dl/g, the density (d) is 0.890 to 0.970 g/cm$^3$ and the N-value calculated with the following equation is 1.7 to 3.0, $$N\text{-Value} = \frac{\log(\dot{\gamma}_{150}/\dot{\gamma}_{20})}{\log(\tau_{150}/\tau_{20})}$$

wherein "$\dot{\gamma}$" is an apparent shear rate (sec$^{-1}$ at 210° C.) and "$\tau$" is an apparent shear stress (dyne/cm$^2$ at 210° C.) and the subscripts "20" and "150" indicate test pressures of 20 kg/cm$^2$ and 150 kg/cm$^2$, respectively.

2. The polyethylene composition as claimed in claim 1, wherein said high molecular weight ethylene homopolymer and said ethylene-α-olefin copolymer and/or said low molecular weight ethylene homopolymer and said ethylene-α-olefin copolymer are prepared by the polymerization in the presence of a highly active Ziegler catalyst containing magnesium halide.

3. The polyethylene composition as claimed in claim 1, wherein said high molecular weight ethylene-α-olefin copolymer and said low molecular weight ethylene-α-olefin copolymer are prepared by copolymerization of ethylene and α-olefin having 3 to 18 carbon atoms.

4. The polyethylene composition as claimed in claim 1 or 3, wherein the α-olefins in said high molecular weight ethylene-α-olefin copolymer and said low molecular weight ethylene-α-olefin copolymer are at least one member selected from the group consisting of 1-butene, 1-pentene, 1-hexene, 4-methyl-1-pentene, 1-heptene, 1-octene, 1-nonene and 1-decene.

* * * * *